W. G. KENDALL & K. SHEPARD.
FASTENER FOR CLOTHES LINES AND THE LIKE.
APPLICATION FILED MAR. 18, 1913.
1,082,751.
Patented Dec. 30, 1913.
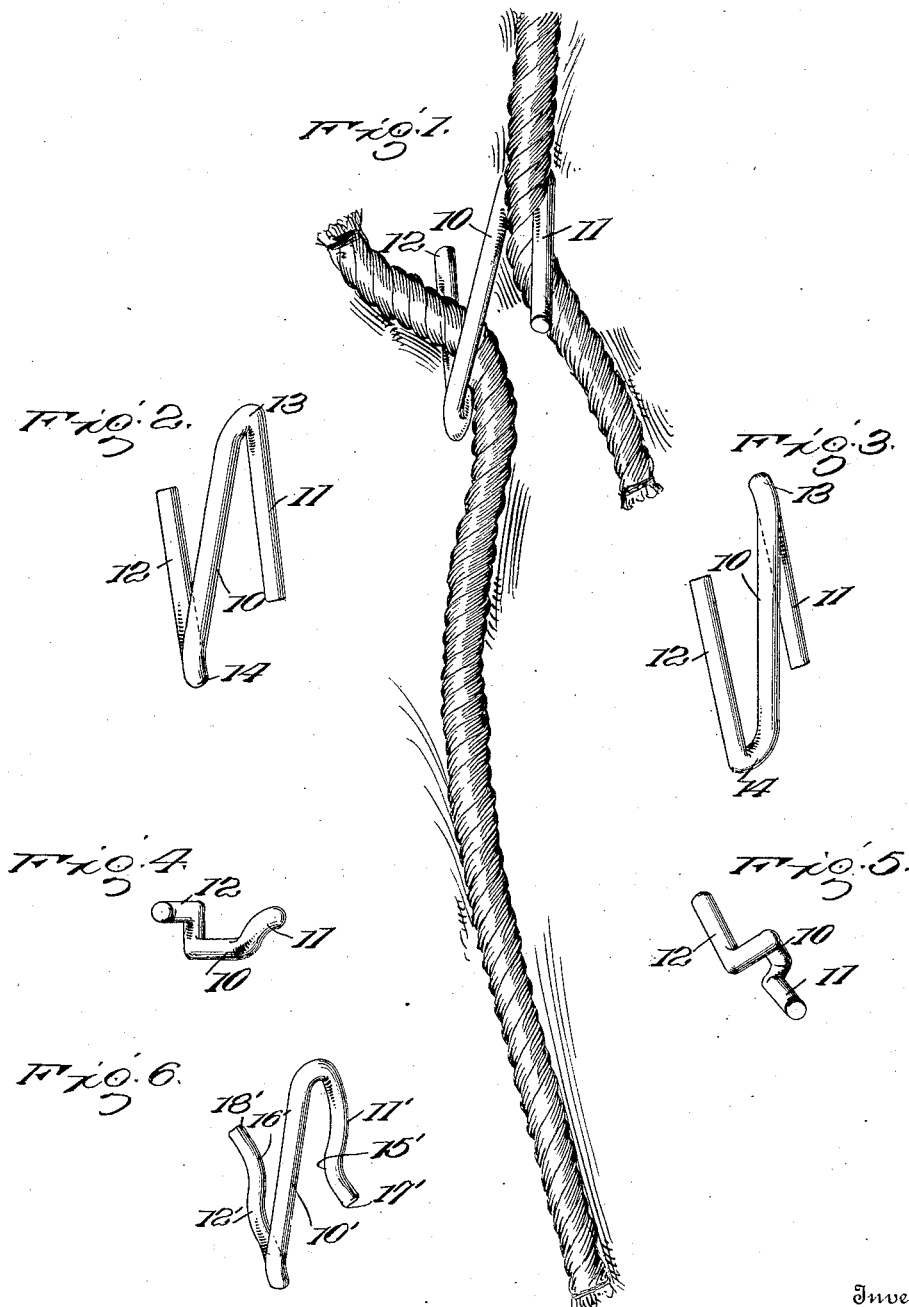

UNITED STATES PATENT OFFICE.

WILLIAM G. KENDALL, OF NEWARK, AND KENNETH SHEPARD, OF EAST ORANGE, NEW JERSEY.

FASTENER FOR CLOTHES-LINES AND THE LIKE.

1,082,751. Specification of Letters Patent. Patented Dec. 30, 1913.

Application filed March 18, 1913. Serial No. 755,176.

*To all whom it may concern:*

Be it known that we, WILLIAM G. KENDALL and KENNETH SHEPARD, citizens of the United States, residing at Newark and East Orange, respectively, in the county of Essex and State of New Jersey, have invented certain new and useful Improvements in Fasteners for Clothes-Lines and the like, of which the following is a specification.

Our invention relates to a new and useful form of fastening device and more particularly to a fastening device for use in securing cords and ropes, especially clothes lines, and the object of our invention is to provide a simple fastening device by means of which the adjacent ends of a clothes line may be secured together without knotting.

A further object of our invention is to provide a fastener of the above described type which may be constructed from a single length of relatively stiff, resilient wire and which is therefore economical in construction, while at the same time durable and of such strength as to be effective in its operation.

With these and other objects in view, our invention will be more fully described, illustrated in the accompanying drawing, and then specifically pointed out in the claims which are attached to and form a part of this application.

In the drawing: Figure 1 shows our fastener in use; Fig. 2 is a front elevation of the fastener; Fig. 3 is a side elevation of the same; Fig. 4 is a plan view of Fig. 2; Fig. 5 is a bottom plan view of Fig. 3; Fig. 6 is a view similar to that of Fig. 2 but showing a modified form of fastener.

Corresponding and like parts are referred to in the following description and indicated in all the views of the drawing by the same reference characters.

The preferred embodiment of our invention comprises a fastener having a straight shank or body portion 10 and angularly disposed, oppositely extending, parallel end portions 11 and 12, the entire fastener being formed from a single length of relatively heavy and stiff, resilient wire, steel wire being preferred.

In forming the fastener one end portion of the wire is bent to form the terminal 11, while the other end portion is bent to form the terminal 12, these terminals extending in opposite directions, upon opposite sides of the shank or body, and substantially parallel to each other with their free ends terminating short of the free ends of the body member but past each other. The end portions 11 and 12 are so bent with respect to the body portion 10 that the bight portions 13 and 14 respectively, lie in planes at right angles to each other and each of these bight portions is bent inwardly slightly as shown in Figs. 2 and 3 of the drawing in such a manner that the shank or body portion extends at an angle to the plane of the bight portion 13 and end portion 11 and also at an angle to the plane of the bight portion 14 and end portion 12. These oppositely disposed bight portions or V-shaped forks forming the gripping portions of the fastener adjacent portions of a clothes line or other rope may be readily secured by inserting a portion of one line in one bight of the fastener and the other portion in another bight of the fastener in the manner clearly shown in Fig. 1 of the drawing.

The lines are preferably inserted in the fastener in such a manner that the free ends of the lines, that is, the ends which, when the fastener is in use, are not subject to strain, are directed outwardly from the fastener. All strain exerted upon the opposite ends of the lines will then tend to not only wedge the lines closer in the V-shaped bight portions of the fastener, but will also tend to swing the end portions 11 and 12 into the plane of the body portion 10, this tendency to swinging movement of the end portions restricting the space between the body portion and end portions and causing the latter to still more closely engage the lines.

Figs. 1 to 5 of the drawings clearly illustrate the specific shape and construction of the fastener, showing the same as it would appear from a number of different directions and any further detailed description is therefore thought to be unnecessary. In Fig. 6 we have illustrated a slightly modified form of fastener construction, this form being identical with that shown in the other figures with the exception that the end portions of the body portion 10′, that is the portions 11′ and 12′, are bent inwardly toward the body or shank portion intermediate their length as shown at 15' and 16' and the terminals or free ends of said end portions are then bent outwardly as shown at 17' and 18'. This construction, due to the out-bent terminals 17' and 18', permits a more ready application of the fastener and at the same time holds the line equally as well, the gripping of the lines in this instance being somewhat increased by the inwardly bent intermediate portions of the members 11' and 12'.

While we have illustrated and described but two forms of our invention, and while these forms differ from each other only in very minor details, it will of course be understood that we do not wish in any way to limit ourselves to the specific details of construction illustrated and described as various changes, within the scope of the appended claims, may be made at any time, without in the slightest degree departing from the spirit of our invention.

The fastening device will preferably either be formed of galvanized wire or the finished fastener will be galvanized, japanned or otherwise coated to protect the same from moisture.

Having thus described the invention, what is claimed as new is:

1. A line fastener formed from a single length of wire, the intermediate portion of which is straight and the end portions of which are re-bent to extend angularly with respect to the body portion and parallel to each other to provide oppositely disposed line engaging bight portions, lying in planes perpendicularly to each other.

2. A line fastener formed from a single length of wire, the intermediate portion of which is straight and the end portions of which are re-bent to extend angularly with respect to the body portion and parallel to each other to provide oppositely disposed line engaging bight portions lying in planes perpendicularly to each other, said bight portions being bent slightly with respect to the shank to position the end portions at an angle thereto.

In testimony whereof we affix our signatures in presence of two witnesses.

WILLIAM G. KENDALL. [L. S.]
KENNETH SHEPARD. [L. S.]

Witnesses:
JOHN H. LEADBEATER,
W. W. MCMAHON.

---

Copies of this patent may be obtained for five cents each, by addressing the "Commissioner of Patents, Washington, D. C."